(12) United States Patent
Tourrilhes et al.

(10) Patent No.: US 8,503,307 B2
(45) Date of Patent: Aug. 6, 2013

(54) DISTRIBUTING DECISION MAKING IN A CENTRALIZED FLOW ROUTING SYSTEM

(75) Inventors: Jean Tourrilhes, Mountain View, CA (US); Praveen Yalagandula, Redwood City, CA (US); Puneet Sharma, Palo Alto, CA (US); Jeffrey Clifford Mogul, Menlo Park, CA (US); Sujata Banerjee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 12/662,885

(22) Filed: May 10, 2010

(65) Prior Publication Data
US 2011/0273988 A1 Nov. 10, 2011

(51) Int. Cl.
*G01R 31/08* (2006.01)
*G06F 15/177* (2006.01)
(52) U.S. Cl.
USPC ........... 370/237; 370/230; 370/412; 370/235; 370/389; 709/221; 709/224; 709/229
(58) Field of Classification Search
USPC .. 370/237, 235, 230, 412, 389, 401; 709/221, 709/223, 224, 229, 220
See application file for complete search history.

(56) References Cited

U.S. PATENT DOCUMENTS

| 6,151,322 | A | * | 11/2000 | Viswanath et al. | ...... | 370/395.53 |
| 6,154,776 | A | * | 11/2000 | Martin | ........................... | 709/226 |
| 2006/0075093 | A1 | * | 4/2006 | Frattura et al. | ................ | 709/224 |

OTHER PUBLICATIONS

Nick McKeown et al., OpenFlow: Enabling Innovation in Campus Networks, Mar. 14, 2008.
Global Environment for Network Innovations, http://geni.net, downloaded May 10, 2010.
Mark Handley et al., XORP: An Open Platform for Network Rearch, ACM SIGCOMM Hot Topics in Networking, 2002.
Eddie Kohler et al., The Click Modular Router, Laboratory for Computer Science, MIT, Jul. 2000.
J. Turner et al., Supercharging PlanetLab—A High Performance, Multi-Application, Overlay Network Platform, ACM SIGCOMM '07, Aug. 27-31, 2007, Kyoto, Japan.
NetFPGA: Programmable Networking Hardware, http://netfpga.org, downloaded May 10, 2010.
OpenFlow Switch Specification, http://netfpga.org, downloaded May 10, 2010.
Martin Casado et al., Ethane: Taking Control of the Enterprise, ACM SIGCOMM '07, Aug. 27-31, 2007, Kyoto, Japan.
Natasha Gude et al., NOX: Towards an Operating System for Networks, In submission, downloaded May 10, 2010.

* cited by examiner

*Primary Examiner* — Andrew Chriss
*Assistant Examiner* — Jamal Javaid

(57) ABSTRACT

Local rules for managing flows devolved from a central controller are received at a switch. The central controller determines a global set of rules for managing flows. The switch receives a packet from a flow from a network and determines whether a metric for the flow satisfies a dynamic condition to trigger a metric report to the central controller. In response to a determination that the metric for the flow at the switch satisfies the dynamic condition to trigger a metric report to the central controller, the switch sends a metric report to the central controller, and the switch then receives an instruction to manage the flow from the central controller. In response to a determination that the metric for the flow at the switch does not satisfy the dynamic condition to trigger the metric report to the central controller, the switch manages the flow using the local rules for managing flows.

19 Claims, 5 Drawing Sheets

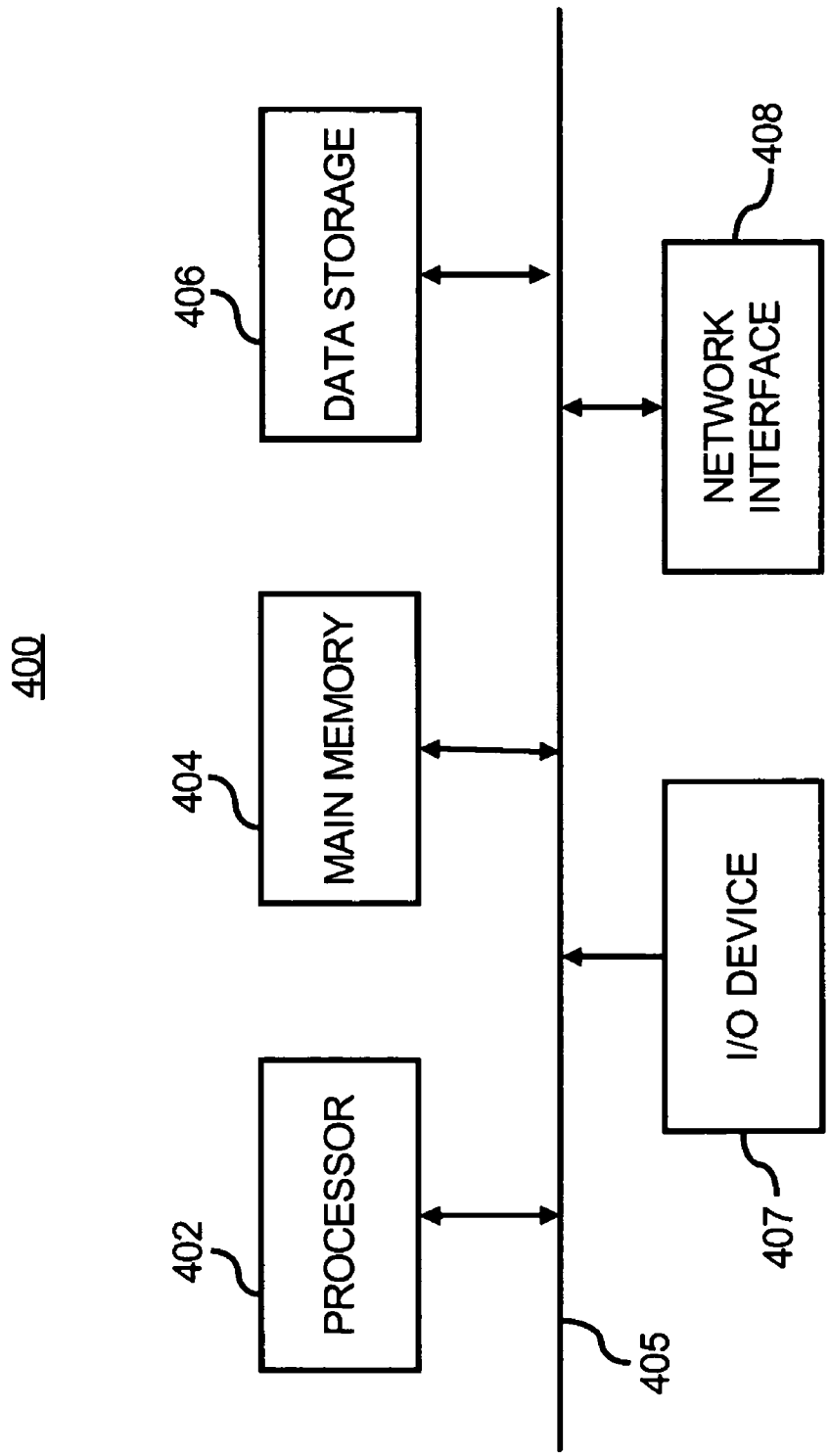

DISTRIBUTING DECISION MAKING IN A CENTRALIZED FLOW ROUTING SYSTEM

BACKGROUND

A centralized flow routing network consists of a set of switches and a logically centralized controller. A flow comprises an aggregation of packets between a source and a destination in the centralized flow routing system. For instance, all hyper text transport protocol (HTTP) packets between two hosts may be defined as a flow. A flow may be a subset of another flow. For example, a specific HTTP connection from the source to the destination can be a subset of all HTTP packets from the source to the destination. A flow may be bidirectional or unidirectional. Centralized flow routing systems provide a framework to enable finer grained, flow-level control of Ethernet (or other kinds of) switches from a global controller.

OpenFlow is one current centralized flow routing system. Upon receiving a packet, a switch in an OpenFlow system extracts a flow identification (flow-ID), defined in one version of the OpenFlow specification by 10 packet header fields across various layers. The switch searches for the flow-ID in its local flow table. The switch performs this search for every packet in the flow. If the flow-ID is found in the flow table, the flow table is known to provide actions such as "forward on the next-hop link I" and "drop packet". If, however, the flow is unknown, the switch forwards the packet to the global controller. The global controller then makes a decision about whether to admit the flow, and how to route the flow through the switches. The global controller sets up the corresponding flow table entries for this new flow in all relevant switches, and sends back the packet to the switch.

Global control offers several benefits. One benefit is the consistent implementation of global policies. For example, instead of having to ensure that firewall rules at each individual router are consistent across the network, in an OpenFlow network the global controller requires only one description of an global access control policy. Another benefit is that the global controller, by participating in all flow-setup decisions, has better visibility of network conditions, and can make globally sound admission-control and quality of service (QoS) decisions.

Unfortunately, the twin benefits of central control and flow-by-flow forwarding decisions may increase costs, such as, increased network overhead from flow-setup communications. When a packet does not match an existing flow-table entry in a switch, the packet is sent to the global controller. The global controller then evaluates its policy rules, picks a path for the flow, installs a flow entry in each switch on the path, and finally forwards the packet to the switch. In addition, any subsequent packet received by a switch before the corresponding flow entry is installed must also be forwarded to the global controller. These round trips to the global controller from each switch delay the delivery of the first packet, or first set of packets. They also consume bandwidth on the control channel, limiting the scalability of flow setup. There is an additional cost of a connection setup overhead. Because a first packet of each new flow goes to the controller, the connection setup time for the flow increases.

BRIEF DESCRIPTION OF THE DRAWINGS

Features of the present invention will become apparent to those skilled in the art from the following description with reference to the figures, in which:

FIG. 5 illustrates a block diagram of a computing apparatus configured to implement or execute the methods depicted in FIGS. 3 and 4, according to an embodiment of the invention.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the embodiments may be practiced without limitation to these specific details. In other instances, well known methods and structures have not been described in detail to avoid unnecessarily obscuring the description of the embodiments. Also, different embodiments described herein may be used in combination with each other.

Disclosed herein are methods and systems for distributing decision making in a centralized flow routing system, according to embodiments. Local rules for managing flows are devolved from a central controller to switches in the system. Each switch in turn manages flows received from a network. The switch determines whether a metric for a packet in the flow satisfies a dynamic condition to trigger a metric report to the central controller. The central controller may thereafter send an instruction to the switch to manage the flow. Additionally or alternatively, the central controller may send an instruction to the switch for managing future flows which match rules detailed in the instruction. Through implementation of the embodiments, the central controller is operable to devolve per-flow controls to the switch and this allows the overall system to support higher flow-arrival rates and to reduce flow setup latency for the majority of flows.

Figure 1:
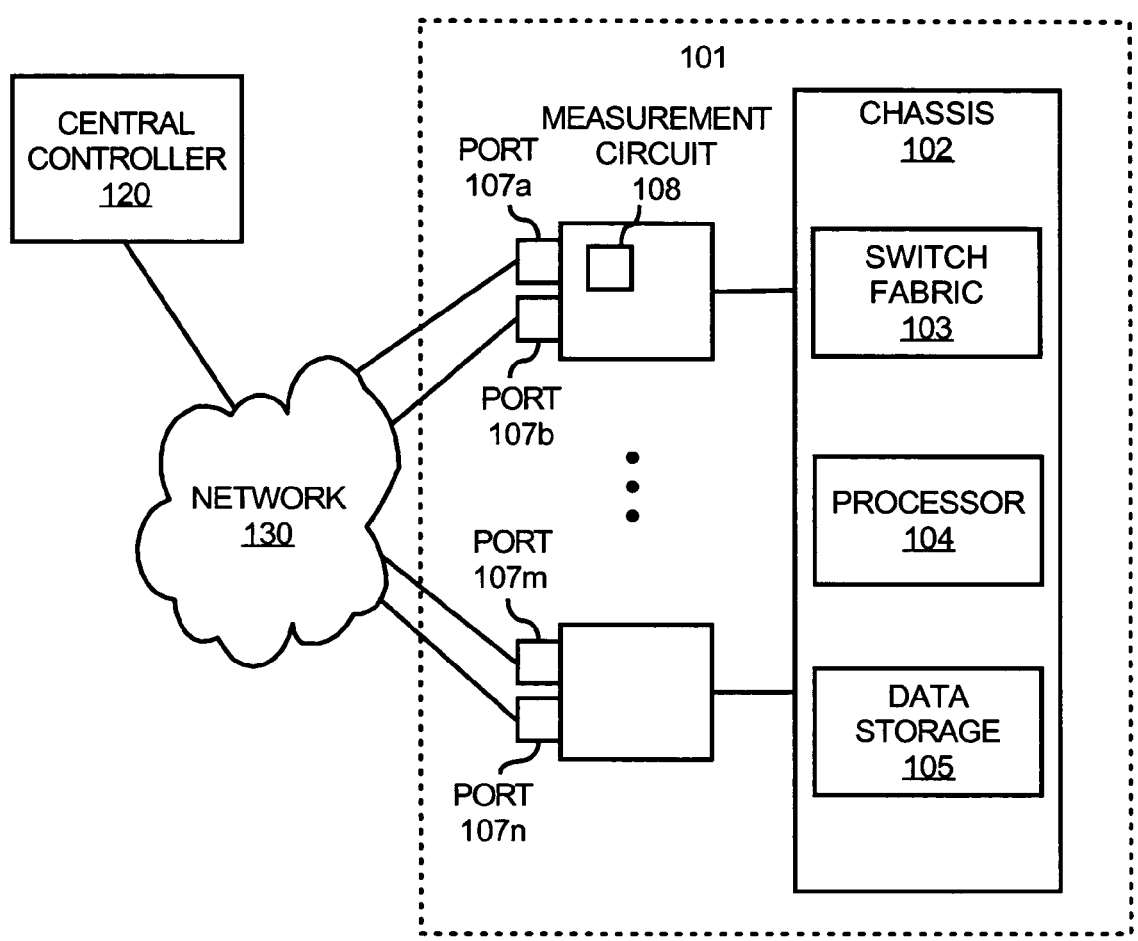
FIG. 1 shows a simplified block diagram of a switch in a centralized flow routing system, according to an embodiment of the invention.

FIG. 1 illustrates a switch 101 in a centralized flow routing system 100, according to an embodiment. It should be clearly understood that the system 100 and the switch 101 may include additional components and that some of the components described herein may be removed and/or modified without departing from a scope of the system 100 and/or the switch 101. The system 100 includes a network 130 and a central controller 120. Although not shown, the central controller 120 may be replicated or its function split among multiple central controllers throughout the network 130. Additionally, the system 100 may include any number of switches, end hosts, and other types of network devices, which may include any device that can connect to the network 130. Devices in the network may be referred to as nodes. Also, the end hosts may include source devices and destination devices.

The switch 101 includes a set of ports 107*a-n*. The ports 107*a-n* are configured to receive and send flows in the network 130. The switch 101 also includes a chassis 102, and a measurement circuit 108. The chassis 102 includes switch fabric 103, a processor 104, data storage 105, and line cards 106*a-f*. As is known in the art, the switch fabric 103 may include a high-speed transmission medium for routing packets between the ports 107a-n internally in the switch 101. The line cards 106a-f may store information for the routing and other tables and information described herein. The line cards 106a-f may also control the internal routing and perform other functions described herein. The switch 101 may be configured to maximize a portion of packet-processing performed on the line cards 106a-f. The packets then travel between line-cards via the switch fabric 103. The processor 104 and data storage 105 that are not on the line cards are used as little as possible, since the available bandwidth between processor 104 and the line cards may be too low. The processor 104 and the storage 105 may be used in cases where the switch 101 exceeds capacity for processing, or storing data, on the line cards 106a-f.

Each of the line cards 102a-f may include multiple ports and port capacities. For instance, in an HP ProCurve 5406z1 switch, a line-card may have 24 ports, each port supporting 1 Gigabit per second (Gbps) in the full-duplex mode, and/or a line-card may have 4 ports, each port supporting 10 Gbps. Each of the line cards 106a-f is connected to the chassis 103. The line cards 106a-f may be pluggable line cards that can be plugged into the chassis 103. The chassis 103 may include a plurality of slots (not shown), wherein line-cards 106a-f may be inserted as required. For instance, the switch 101 may have between 4 and 9 slots for inserting line cards as is known for switches deployed in data centers or as network edges. In other instances, the line cards 106a-f are non-pluggable and integrated in the switch 101.

The measurement circuit 108 may be used to measure bit rate and a number of packets for each flow received from the network 130. The measurement circuit 108 may be built into the line cards 106a-f. Note that the measurement circuit 108 may sample the packets, count the packets or perform a combination of sampling and counting the packets. The measurement circuit 108 may also sample or count: the number of bytes for each flow; the number of bytes for a flow during a given interval; the number of packets for a flow during a given interval; or the number of one or more kinds of events, including occurrences of packets with specific transmission control protocol (TCP) flags such as synchronous idle (SYN) or reset (RST), or occurrences of packets of specific types such as specific video frame types, or other such identifiable packet characteristics. The measurement circuit 108 may also report flows whose duration exceeds a threshold.

The switch 101 is configured to control the flows using local rules devolved from the central controller 120. For instance, the central controller 120 determines the local rules for the switch 101 based on loads derived from measurements received from switches and based on global policies and network topology. The central controller 120 sends the local rules to the switch 101 over the network 130.

Figure 2:
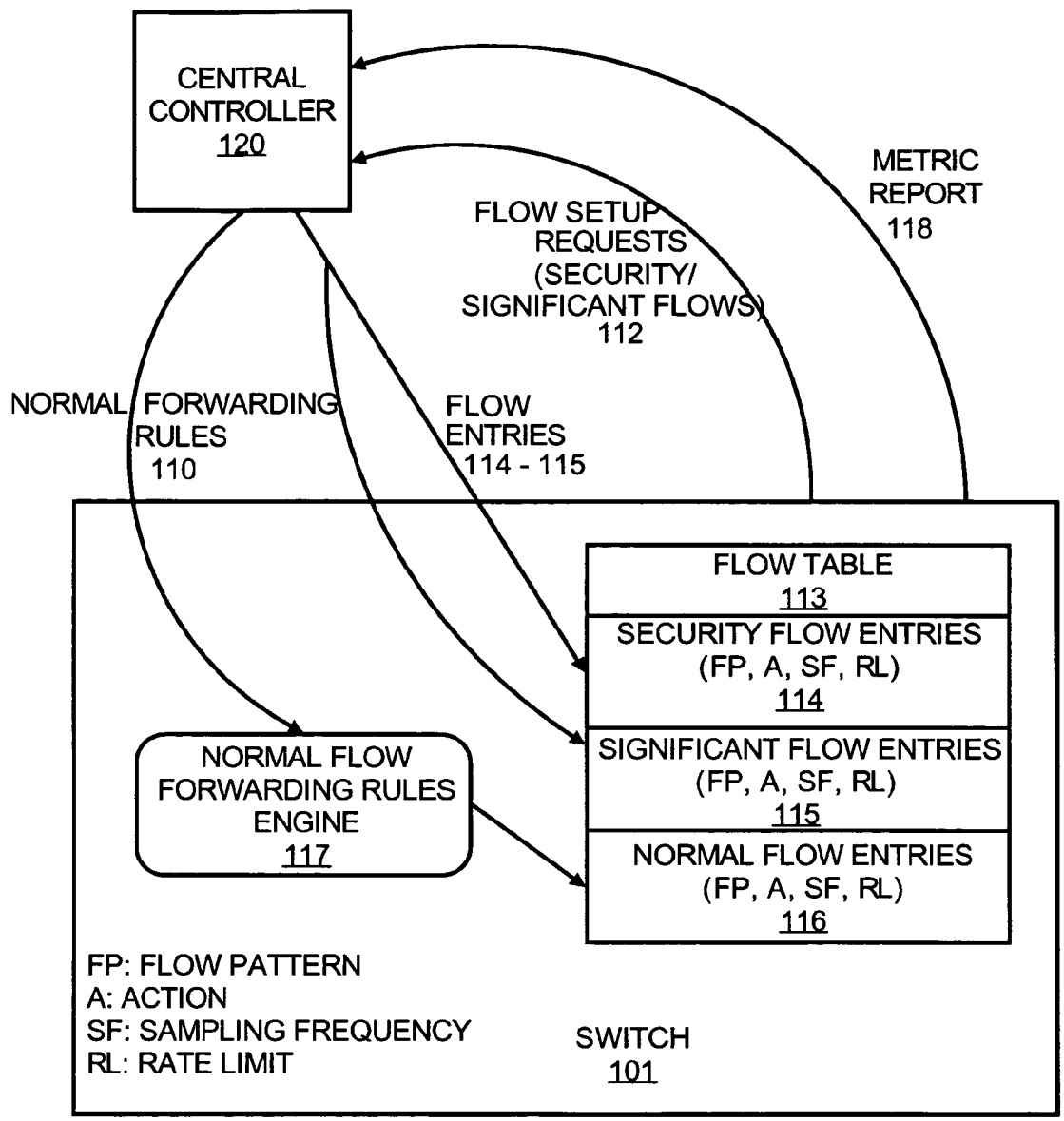
FIG. 2 shows an implementation of local rules for managing flows at a switch, according to an embodiment of the invention.

The local rules include normal flow forwarding rules, significant flow rules, and security flow rules. A normal flow is a flow that is managed by the switch 101 using the normal flow forwarding rules without invoking the central controller 120. For instance, the switch 101 may receive a normal flow and thereafter manage the normal flow using the normal flow forwarding rules engine 117 as shown in FIG. 2. A significant flow is a flow for which the switch 101 determines that the flow exceeds a threshold triggering a metric report 118. The threshold is based upon a dynamic condition of the network 130, for instance bit rate or packet count at the switch 101. The switch 101 is configured to thereafter invoke the central controller 120. The switch 101 may continue to forward packets for that flow according to the normal rules, in addition to sending a metric report 118. Optionally, the rule provided by the central controller 120 may instruct the switch 101 to include a new local rule to stop forwarding packets for that flow if the metric report 118 is triggered. Thereafter, for packets received, the switch 101 stops forwarding packets for that flow.

The central controller 120 may use the metric report 118 and to determine whether the dynamic condition at the switch 101 affects the network 130 such that the dynamic condition requires adjustment in order to comply with global policies. For instance, the global policies may be related to congestion and QoS. The central controller 120 may then send an instruction to the switch 101 to manage the flow that was the subject of the report. The instruction may include a security flow entry 114 or a significant flow entry 115. A security flow is a flow for which the switch 101 is required to send a flow-setup request to the central controller 120. The switch 101 may be configured to delay the flow until an instruction is received from the central controller 120.

Flows received at the switch 101 are looked up in the switch's flow table 113 to determine whether the flow is a normal flow, a significant flow, or a security flow, and the measurements are sent to the central controller 120, for example, in metric measurement reports. The measurement may be probabilistic, such as setting the sampling rate for a flow covered by a particular flow-ID pattern. Alternately, the central controller 120 may request a measurement at the end of each flow, or periodically during longer flows. Multiple metric reports between the switch 101 and the central controller 120 may be batched to improve communication efficiency. The local rules are thereafter applied by the switch 101 according to a type of flow, as described with respect to FIG. 2 herein below.

The central controller 120 provides a global set of rules for the network 130. For instance, a manager or administrator may enter the global set of rules into the central controller 120. The central controller 120 thereafter maintains global policies using the global set of rules for the network 130. The global rules may be based on quality of service (QoS) and performance goals. The central controller 120 determines a current load on the switches in the network 130, for example, based on metric reports from nodes in the network 130. The central controller 120 also maintains a current topology of the network 130 through communication with the switch 101 and other nodes in the network 130. For instance, whenever the switch 101 learns about a media access control (MAC) address of a new node, the switch 101 reports the MAC address to the central controller 120. The central controller 120 may use the topology of the network 130 and the load on the network 130 in a feedback control system to direct switches, including the switch 101, to adjust the switch 101 to maintain global policies specified in the global rules. For instance, certain flows, as specified by rules provided by the controller, through the switch 101 may be rate limited, or a flow may be routed through other switches in the network 130.

In one embodiment, the central controller 120 maintains the global policies of the network 130 by dynamically updating thresholds for network metrics upon which the local rules for controlling flows at the switch 101 are based. The metrics may include, for instance, a bit rate or packet count at the switch 101. The thresholds are dynamic because the central controller 120 adjusts the thresholds based on load on the network 130 and the topology of the network 130. By satisfying the dynamic condition, for instance exceeding the threshold for a bit rate or packet count, the switch 101 triggers a metric report 118 and sends the metric report 118 to the central controller 120. The central controller 120 determines the local rules for the switch 101 and sends the local rules to the switch 101 to implement flow control. This also enables the switch 101 to manage flows using the local rules without contacting the central controller 120 for each flow unless the flow satisfies the dynamic condition. Thus, by devolving control of the flows to the switch 101 and other switches, the central controller 120 may reduce latency in the network 130 caused by unnecessary controller communication overhead. Based on local rules received from the central controller 120 and stored at the switch 101, the switch 101 may thereafter reliably forward each of the flows using a single path or a multiple paths as defined in the local rules.

The central controller 120 may asynchronously (i.e., independent of a flow setup request) send an update to the switch 101 to change the local rules at the switch 101. New local rules may be received in an instruction from the central controller 120 based on the metric report 118. For instance, the bit rate in the threshold at the switch 101 may be changed, depending on bit rate through other switches in the network 130. Alternately, the central controller 120 may place a timeout or expiration (in terms of seconds) or a limit (in terms of a number of flows) on a rule, after which the switch would have to contact the central controller 120 on a first packet of each flow until it gets a new local rule from the central controller 120.

FIG. 2 illustrates an implementation of the local rules at the switch 101, according to an embodiment. The switch 101 implements the local rules using a flow table 113, and a normal flow forwarding rules engine 117. The flow table 113 includes security flow entries 114, significant flow entries 115, and normal flow entries 116. Each of the flow entries in the flow table 113, including the security flow entries 114, the significant flow entries 115, and the normal flow entries 116, provide a protocol with which the switch 101 manages the flow or contacts the central controller 120. For each entry in the flow table 113, the switch 101 may store a flow pattern (FP) identifier, an action (A), a sampling frequency (SF), a rate limit (RL), and other sampling or counting instructions. The flow table 113 and the normal flow forwarding rules engine 117 are determined by the local rules devolved from the central controller 120. If the controller 120 specifies multiple measurement or sampling conditions for a flow, the switch 101 may implement this either by attaching multiple conditions to a rule, or by maintaining multiple rules for the flow and allowing a single packet to match more than one rule.

The switch 101 receives the packets at the ports 107a-n (as shown in FIG. 1). The switch 101 generates a flow-specification from the packet by extracting certain header fields, and other meta-information, and then looks up the flow in its flow table. If the central controller has defined a flow as a security-sensitive flow, the action associated with the flow will be to require the switch to send a flow-setup request to the controller, and to refrain from forwarding the packet. Otherwise, the action may allow the switch to forward the packet, and may also ask the switch to send a flow-report to the controller. The action may also instruct the switch to create a new flow-specific flow-table entry based on the original flow-table entry, inheriting the indications and thresholds stored with the original flow-table entry. The central controller 120 is therefore able to retain control over security-sensitive flows in the network 120. The central controller 120 thereafter may setup the flow or direct the switch 101 to drop the flow.

The metric may also indicate whether the flow was forwarded from one virtual local area network (VLAN) to a different VLAN. Packets that are sent between different VLANs (i.e., because the destination IP address is on a separate VLAN from the source IP address) require a flow-setup request to the central controller 120, while packets that are entirely within the same VLAN do not.

If the flow is allowed in terms of security, the switch 101 determines whether a metric for the flow exceeds a threshold to trigger a metric report 118 to the central controller 120. The metrics and corresponding thresholds are specified in the local rules by the central controller 120. The central controller 120 may dynamically update the per-rule thresholds at the switch 101 to maintain global properties of the network 130. The threshold for the metrics provided in the local rules forms a dynamic condition on the switch 101. For instance, the dynamic condition may be based on a shared resource usage among multiple switches in the network 130, such as bandwidth. The metrics may include a bit rate, a packet count, or a combination of bit rate and packet count. For instance, the threshold may specify "packet count>X" or "bit rate>Y" or "bit rate<Z". The bit rate may be measured over intervals, defined either implicitly or explicitly, over which the rates are computed. Additionally, the switch 101 may use exponentially weighted moving averages as a way to smooth measurements. Note the threshold may be dynamically updated by the central controller 120 based on changes in the load on the network 130 and changes in the topology of the network 130. For example, there may be a shared overall bit rate for a sub set of switches including the switch 101. The switch 101 may be allowed additional bit rate in instances where remaining switches of the subset are under utilizing their allocation of the bit rate.

The switch 101 may process each packet using the normal flow forwarding rules engine 117, regardless of whether a packet causes a threshold to be exceeded. However, if a rule includes a flag indicating that the switch 101 should not forward packets from a flow that has exceeded a threshold, then instead the switch 101 may send a threshold-exceeded message to the central controller 120, and await further instructions about how to process this flow. Alternatively, a rule may include a flag telling the switch 101 to drop all packets for a flow that exceeds a threshold, as a means of defending against certain kinds of denial-of-service attacks.

If the metric first exceeds the threshold, the switch 101 sends a metric report 118, as shown in FIG. 2, to the central controller. The central controller 120 thereby retains oversight of the switch 101. The central controller 120 may override the switch 101 as needed. For instance, the central controller 120 may re-route, rate limit, or reprioritize the flow based on the metric report 118. Alternately, the significant flow entries may provide multi-flow setup. Upon being invoked for a flow setup request, the central controller 120 may provide the switch with flow-setup information for multiple flows. For subsequent flows of the multiple flows, the multi-flow setup becomes a part of the normal flow forwarding rules.

Methods in which the system 100 may be employed for distributing decision making will now be described with respect to the following flow diagram of the methods 300 and 350 depicted in FIGS. 3 and 4. It should be apparent to those of ordinary skill in the art that the methods 300 and 350 represent generalized illustrations and that other steps may be added or existing steps may be removed, modified or rearranged without departing from the scopes of the methods 300 and 350.

The descriptions of the methods 300 and 350 are made with reference to the system 100 illustrated in FIG. 1, and thus makes reference to the elements cited therein. It should, however, be understood that the methods 300 and 350 are not limited to the elements set forth in the system 100. Instead, it should be understood that the methods 300 and 350 may be practiced by a system having a different configuration than that set forth in the system 100.

Figure 3:
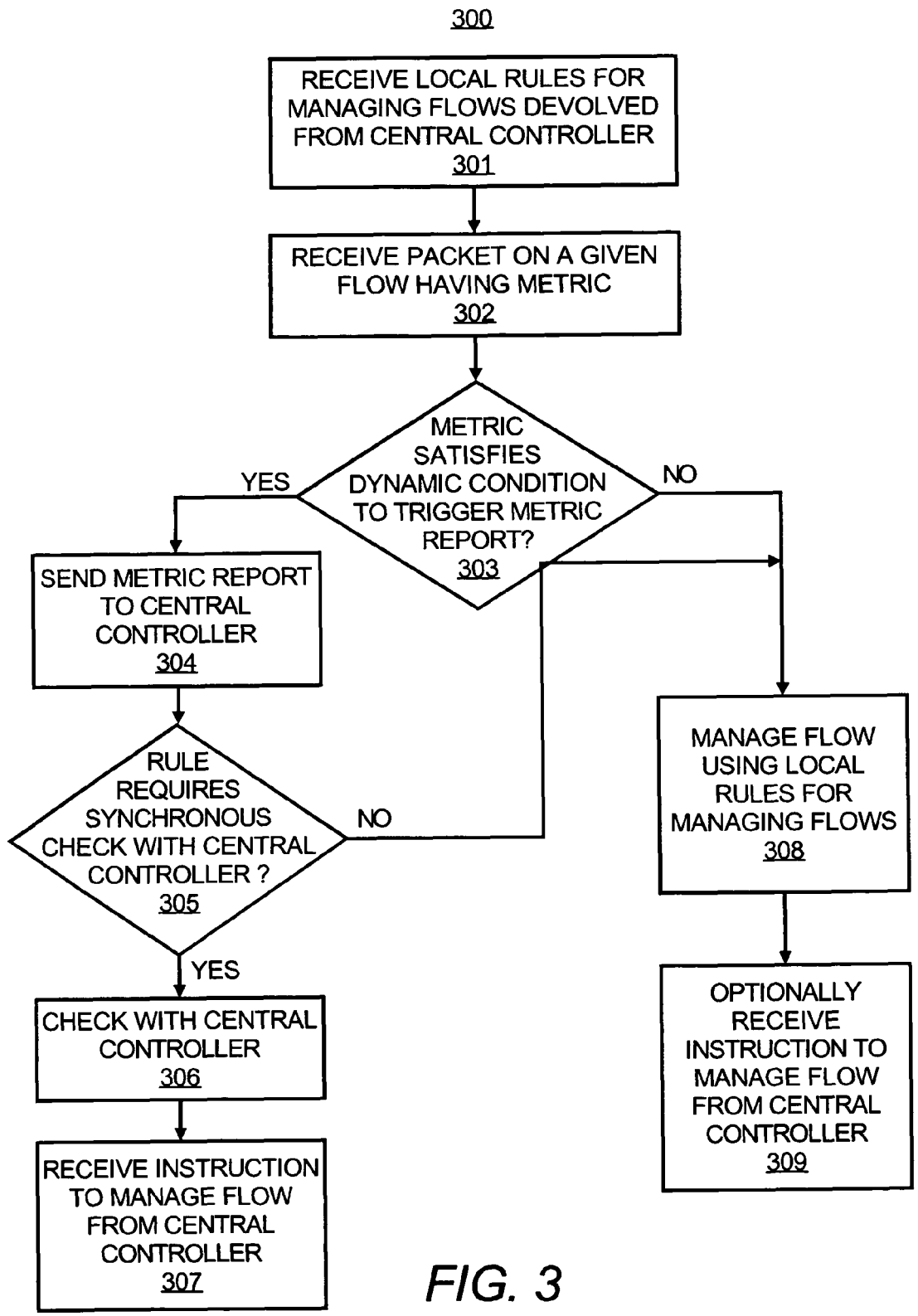
FIG. 3 illustrates a flowchart of a method for distributing decision making in a centralized flow routing system, according to an embodiment of the invention.

With reference first to FIG. 3, there is shown a flowchart of a method 300 for distributing decision making in a centralized flow routing system, according to an embodiment. The method 300 may be performed at the switch 101. Using the method 300, the system 100 devolves decision making from the central controller 120 to the switch 101.

The processor 104 in the switch 101, may implement or execute the system 100 to perform one or more of the steps described in the method 300 in distributing decision making in the network 130. In another embodiment, the central controller 120 devolves some controls to a subset of co-operating switches rather than each switch acting alone in conjunction with the central controller 120. The cooperation between switches may be done via an inter-switch control/management protocol in addition to the central controller 120 issued commands.

At step 301, the switch 101 receives the local rules for managing flows devolved from the central controller 120. The local rules may include normal flow forwarding rules, significant flow rules, and security flow rules. The local rules devolved from the central controller 120 may be applied based on a type of flow received at the switch 101. Additionally, the local rules include thresholds for metrics measured at the switch 101. For instance, the metrics include bit rate, packet count, or a combination of bit rate and packet count.

At step 302, the switch 101 receives a packet in a flow. The packet may comprise any packet within the flow.

At step 303, the switch 101 determines whether a metric for the flow satisfies a dynamic condition to trigger a metric report 118. For instance, the switch 101 may sample the flow using the measurement circuit 108. The central controller 120 using the global rules determines the local rules including the dynamic condition and sends the local rules to the switch 101. The metric is measured and thereafter, the switch 101 compares the metric measured at the switch 101 to the metric threshold provided in the local rules. For instance, if the metric threshold is a packet count threshold, the switch 101 may compare the packet count in the flow to the packet count threshold.

At step 304, in response to a determination that the metric satisfies the dynamic condition, the switch 101 sends the metric report 118 to the central controller 120. For example, flows having a long duration and a high-bandwidth may be significant because the manager of the system 100 may want to provide improved QoS. In this instance, the metric threshold may be determined based on a combination of bandwidth and the duration of the flow. Alternately, an especially active host's flows might be significant because the manager may want to rate limit high volume users. The central controller 120 based on volume of use by each end host determines the metric threshold in the local rules. Similarly, other metric thresholds may be determined based on global priorities. The switch 101 may delay invocation of the central controller 120 until a condition specified by the central controller 120 is met.

In another example, the local rules may specify that after N packets on the flow that a threshold condition has been met. For instance with N=40 the central controller 120 learns of any flow that comprises at least 40 packets. Alternately, the local rules may specify that the switch 101 is to invoke the central controller after N bytes on the flow, if the average rate of flow goes above B bits/sec, or for specific source and/or destination TCP ports. Additionally, the central controller 120 may be invoked for specific source and/or destination IP addresses, for wildcards that match some subpart of the IP address, for higher-layer protocol features (e.g., using deep packet inspection). The central controller 120 may also be invoked for a hyper text transfer protocol (HTTP) flow with a Request-URI matching (or not matching) a string pattern specified by the central controller 120; e.g., a specific MPEG frame type.

At step 304, the switch 101 determines whether the packet requires a synchronous check with the central controller 120. At step 306, the switch 101 checks with the central controller 120 in response to a determination at step 305 that the rule requires a synchronous check with the central controller 120, Thereafter, at step 307, the switch 101 may receive an instruction from the central controller 120. For instance, the central controller 120 sets up the corresponding flow table entries for this new flow in all relevant switches, and sends the packet to the switch 101. The central controller 120 may also rate limit the flow at the switch 120. Additionally, the central controller 120 may update the metric threshold to provide a greater or lesser limit on the metric at the switch 101

At step 308, in response to a determination at step 303 that the metric does not satisfy the dynamic condition, the switch 101 manages the flow using the normal flow forwarding rules devolved from the central controller 120. The switch 101 also manages the flow using the normal flow forwarding rules devolved from the central controller 120 in response to a determination at step 305 that the rule does not require a synchronous check with the central controller 120. For instance, the normal flow forwarding rules may comprise multi-path rules in which the central controller 120 provides a flow setup rule with a wildcard flow-ID, to match (for example) all flows between two end hosts, and a plurality of next-hop destinations for the flows matching this rule. The switch 101 then chooses a specific next-hop destination upon a flow arrival. The normal flow forwarding rules may specify that the choice is made round-robin, randomly, based on switch-local knowledge of traffic, etc. The normal flow forwarding rules may also specify weights so that some paths are chosen more often than others.

At step 309, the switch 101 may optionally receive an instruction to manage the flow from the central controller 120.

Figure 4:
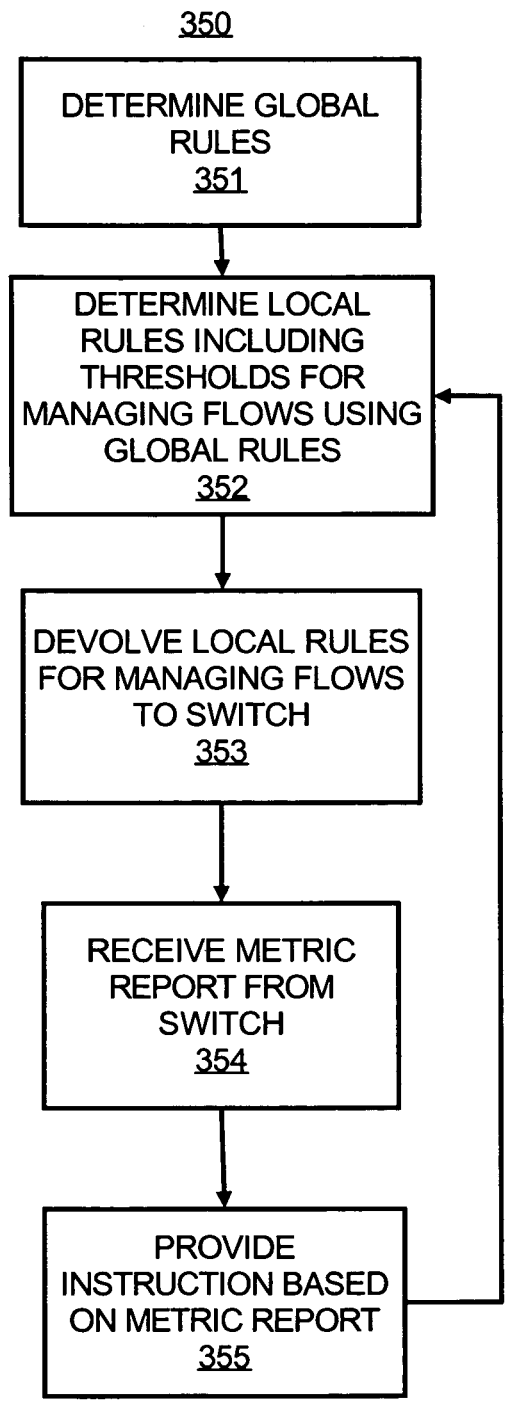
FIG. 4 illustrates a flowchart of a method for distributing decision making in a centralized flow routing system, according to an embodiment of the invention.

With reference next to FIG. 4, there is shown a flowchart of a method 350 for distributing decision making in a centralized flow routing system, according to an example. The method 350 may be performed at the central controller 120. The central controller 120 may be a single device or a distributed system.

At step 351, the central controller 120 determines global rules for the network 130. For instance, the central controller may receive global rules based on global policies entered by a manager or an administrator of the system 100.

At step 352, the central controller 120 determines local rules for the switch 101 and other similar switches in the system 100. The local rules are determined using the global rules. For instance, the local rules determined by the central controller 120 may provide probabilistic admission control in which the central controller 120 directs the switch 101 to drop new flows matching a wildcard flow-ID (or even a singleton flow-ID). For example, such flows could be dropped with probability =P, or if the rate of flows matching the flow-ID exceeds a threshold T, or if there are more than N current flows matching the flow-ID.

At step 353, the central controller 120 devolves the local rules to the switch 101. The central controller 120 may devolve the local rules to a plurality of switches such as the switch 101. Devolving may include determining and sending local rules to a switch.

At step 354, the central controller 120 receives a metric report 118 from the switch 101. The metric report 118 may be received as asynchronous update in which the switch 101 forwards packets of a flow until the central controller 120 provides an instruction regarding the flow. Alternatively, at step 364, the central controller 120 receives a flow-setup request 112 from switch 101 as a synchronous request, and in addition to responding to this request with an instruction regarding the flow, the controller may also use the information in this flow-setup request to refine the local rules of step 352. The central controller 120 may therefore use multiple sources of information, for instance flow setup requests, and metric reports to determine actions regarding the current flow and subsequent flows.

At step 355, the central controller 120 provides an instruction for the switch 101 based on the metric report 118. For instance, the central controller 120 may setup the requested flow for a new flow. Additionally, the central controller 120 may adjust the thresholds for the metrics to meet global policies. The central controller 120 thereby updates the dynamic conditions on the network 130. Thereafter, the updated thresholds and local rules may be devolved to the switch 101 asynchronously.

Some or all of the operations set forth in the methods 300 and 350 and other functions and operations described herein may be embodied in computer programs stored on a storage device. For example, the computer programs may exist as software program(s) comprised of program instructions in source code, object code, executable code or other formats.

Exemplary storage devices include conventional RAM, ROM, EPROM, EEPROM, and disks. It is therefore to be understood that any electronic device capable of executing the above-described functions may perform those functions enumerated above.

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for distributing decision making in a centralized flow routing system, said method comprising by a network switch:
   receiving local rules devolved from a central controller that determines a global set of rules for managing flows, wherein the local rules comprise a definition of a dynamic condition, multiple per-flow forwarding rules each of which applies to a different respective individual flow, and a multi-flow forwarding rules engine that applies to each of multiple different flows;
   from a network, receiving a packet of a particular flow;
   determining whether the particular flow requires the switch to communicate with the central controller, wherein
      the determining comprises ascertaining whether the particular flow satisfies the dynamic condition, wherein the ascertaining comprises ascertaining whether a metric for the particular flow exceeds a threshold, and
      the determining comprises determining at least one of a security status of the particular flow and whether the particular flow is being forwarded from one virtual local area network (VLAN) to another VLAN;
   based on a determination that the particular flow satisfies the dynamic condition,
      transmitting to the central controller a metric report comprising one or more flow metrics characterizing the particular flow,
      receiving from the central controller an instruction for a particular per-flow forwarding rule for managing the particular flow, and
      forwarding the particular flow according to the per-flow forwarding rule; and
   based on a determination that the particular flow does not satisfy the dynamic condition, forwarding the particular flow according to the multi-flow forwarding rules engine.

2. The method according to claim 1, wherein the switch ceases to forward packets for the particular flow until receiving the instruction.

3. The method according to claim 1, further comprising:
   modifying the dynamic condition in response to an instruction from the central controller, wherein the dynamic condition comprises a threshold on a bit rate of the flow or a packet rate of the particular flow.

4. The method according to claim 3, wherein the dynamic condition comprises a shared resource usage among multiple switches in the network.

5. The method according to claim 1, wherein the instruction to manage the particular flow comprises one of re-routing, rate limiting, and reprioritizing the particular flow.

6. The method according to claim 1, wherein the determining of the security status of the particular flow comprises determining a particular metric for the particular flow that indicates the security status of the particular flow.

7. The method according to claim 1, wherein the central controller is a distributed system.

8. The method according to claim 1, wherein the determining of whether the particular flow is being forwarded from one VLAN to another VLAN comprises determining a particular metric for the particular flow that indicates whether the particular flow is being forwarded from one virtual local area network (VLAN) to another VLAN.

9. The method according to claim 1, wherein the metric for the flow at the switch indicates a number of packets in the particular flow.

10. The method according to claim 1, wherein the metric for the flow at the switch indicates a duration of the particular flow.

11. The method according to claim 1, wherein the metric for the flow at the switch indicates a number of bytes in the particular flow.

12. The method according to claim 1, wherein the metric for the flow at the switch indicates a number of occurrences of a specific type of packet or packet header field value in the particular flow.

13. A switch in a centralized flow routing system, the switch comprising:
   data storage configured to store local rules devolved from a central controller that determines a global set of rules for managing flows, wherein the local rules comprise a definition of a dynamic condition, multiple per-flow forwarding rules each of which applies to a different respective individual flow, and a multi-flow forwarding rules engine that applies to each of multiple different flows;
   a port configured to receive a packet of a particular flow from a network;

a processor configured to perform operations comprising
determining whether the particular flow requires the
switch to communicate with the central controller,
wherein
the determining comprises ascertaining whether the particular flow satisfies the dynamic condition, wherein the ascertaining comprises ascertaining whether a metric for the particular flow exceeds a threshold, and
the determining comprises determining at least one of a security status of the particular flow and whether the particular flow is being forwarded from one virtual local area network (VLAN) to another VLAN;
based on a determination that the particular flow satisfies the dynamic condition, the processor is operable to perform operations comprising
transmitting to the central controller a metric report comprising one or more flow metrics characterizing the particular flow, and
receiving from the central controller an instruction for a particular per-flow forwarding rule for managing the particular flow, and
forwarding the particular flow according to the per-flow forwarding rule; and
based on a determination that the particular flow does not satisfy the dynamic condition, the processor is configured to forward the particular flow according to the multi-flow forwarding rules engine.

14. The switch according to claim 13, further configured to: modify the dynamic condition in response to an instruction from the central controller, wherein the dynamic condition comprises a threshold on a bit rate of a flow or a packet rate of a flow.

15. The switch according to claim 14, wherein the dynamic condition comprises a shared resource usage among multiple switches in the network.

16. The switch according to claim 14, wherein the instruction to manage the particular flow comprises one of re-routing, rate limiting, and reprioritizing the particular flow.

17. The switch according to claim 13, wherein the determining of the security status of the particular flow comprises determining a particular metric for the particular flow that indicates the security status of the particular flow.

18. The switch according to claim 13, further comprising: a measurement circuit configured to sample packets received at the port to determine whether a metric for a flow at the switch exceeds a threshold to trigger a report to the central controller.

19. A non-transitory computer readable storage medium on which is embedded one or more computer programs that, when executed by a processor, implement a method for distributing decision making in a centralized flow routing system comprising:
receiving local rules devolved from a central controller that determines a global set of rules for managing flows, wherein the local rules comprise a definition of a dynamic condition, multiple per-flow forwarding rules each of which applies to a different respective individual flow, and a multi-flow forwarding rules engine that applies to each of multiple different flows;
from a network, receiving a packet of a particular flow;
determining whether the particular flow requires the processor to communicate with the central controller, wherein
the determining comprises ascertaining whether the particular flow satisfies the dynamic condition, wherein the ascertaining comprises ascertaining whether a metric for the particular flow exceeds a threshold, and
the determining comprises determining at least one of a security status of the particular flow and whether the particular flow is being forwarded from one virtual local area network (VLAN) to another VLAN;
based on a determination that the particular flow satisfies the dynamic condition,
transmitting to the central controller a metric report comprising one or more flow metrics characterizing the particular flow,
receiving from the central controller an instruction for a particular per-flow forwarding rule for managing the particular flow, and
forwarding the particular flow according to the per-flow forwarding rule; and
based on a determination that the particular flow does not satisfy the dynamic condition, forwarding the particular flow according to the multi-flow forwarding rules engine.

* * * * *